S. KASPRZYCKI.
AUTOMOBILE WHEEL.
APPLICATION FILED AUG. 20, 1917.

1,266,600.

Patented May 21, 1918.

Inventor
S. Kasprzycki

By A. M. Wilson

Attorney

UNITED STATES PATENT OFFICE.

STANLY KASPRZYCKI, OF SOUTH HOLLAND, ILLINOIS, ASSIGNOR OF ONE-FOURTH TO BOLESLAW STANKIEWICZ AND ONE-FOURTH TO ALBERT WANTOR, BOTH OF ADENA, OHIO.

AUTOMOBILE-WHEEL.

1,266,600.      Specification of Letters Patent.      Patented May 21, 1918.

Application filed August 20, 1917. Serial No. 187,112.

*To all whom it may concern:*

Be it known that I, STANLY KASPRZYCKI, a subject of the Emperor of Austria, residing at South Holland, in the county of Cook and State of Illinois, have invented certain new and useful Improvements in Automobile-Wheels, of which the following is a specification.

This invention relates to certain new and useful improvements in automobile wheels.

The primary object of the invention is the provision of an automobile wheel arranged with a resilient tread member, the structure being readily disassembled for interchanging the parts thereof when found desirable.

A further object of the device is the provision of a wheel that is easy and inexpensive to manufacture, possesses great strength and affords resiliency for travel without the necessity of employing a pneumatic tire.

With these general objects in view and others that will appear as the nature of the invention is better understood, the same consists in the novel arrangement and combination of parts herein more fully described in the accompanying drawing and then claimed.

In the drawing forming a part of this application and in which like reference characters designate corresponding parts throughout the several views, Figure 1 is a side elevation of a portion of a wheel embodying my invention and partially broken away.

Figure 1:
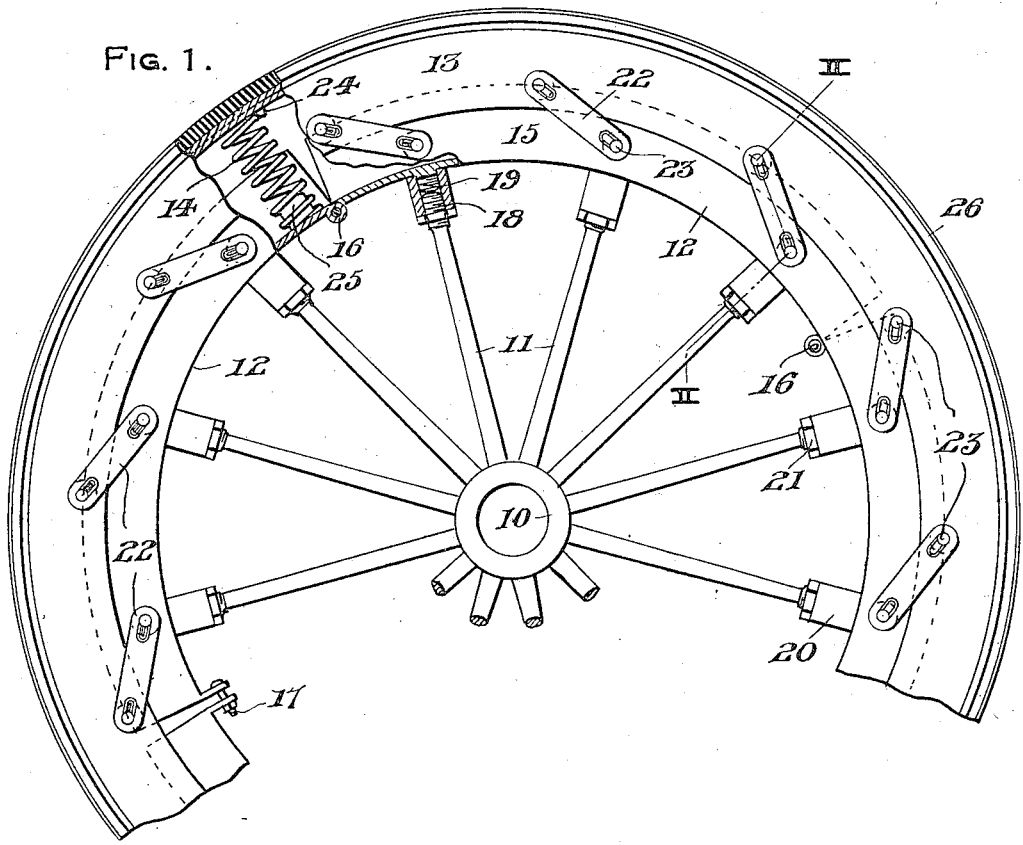
Figures 2, 3:
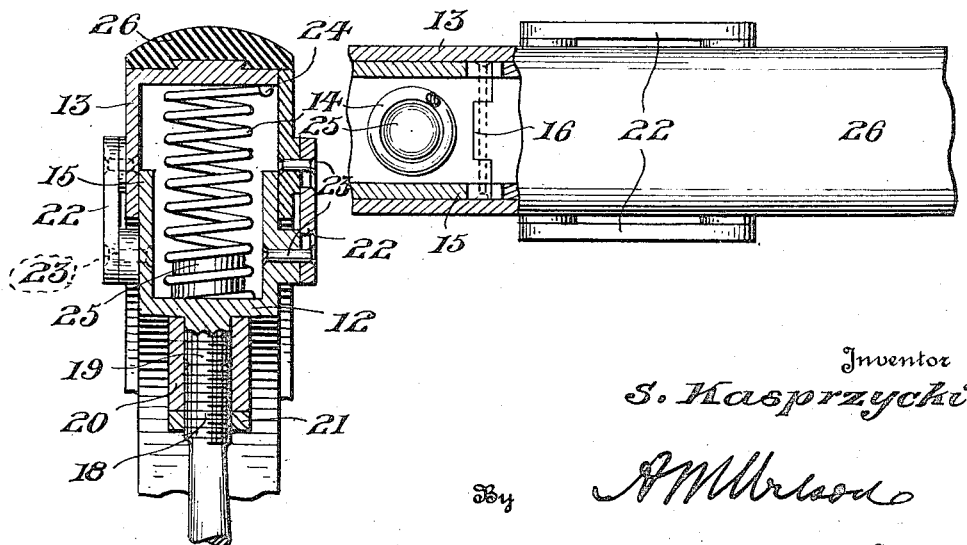
Fig. 2 is a detailed sectional view taken upon line II—II of Fig. 1.
Fig. 3 is a top plan view of a portion of the wheel with a part of the device shown in section.

Referring more in detail to the drawing, the wheel broadly consists of a hub 10 having radially projecting spokes 11 with a sectional felly 12 removably carried by the spokes and with a metal tire member 13 resiliently carried by the felly upon interposed helical springs 14.

The felly 12 is formed in a plurality of sections 15 which are U-shaped in cross section and connected together by hinges 16 arranged inwardly of the felly while two adjacent sections may be detachably connected together by means of a bolt 17. A threaded head 18 is arranged upon the outer end of each of the spokes 11 adapted for abutting against inwardly projecting threaded studs 19 carried by the felly 12, while sleeves 20 are threaded upon the heads 18 and studs 19 for securely connecting the spokes 11 with the felly 12. It will be noted that the screw threads of the heads and studs are of the same inclination while the threads of the sleeves 20 correspond therewith for accomplishing the desired operation and that a lock nut 21 is preferably provided for each of the sleeves 20.

The tire member 13 is in the form of an annulus of channel arrangement fitting over the felly 12 and adjustably connected thereto by means of slotted links 22 arranged at the opposite sides of the wheel and pivoted to the felly and tire member by suitable rivets 23.

By means of this arrangement it will be seen that during the forward movement of the wheel the links 22 will have both an arcuate and a relatively downward movement in counter direction to the movement of the wheel, whereby the tire-member will have relative movement with respect to the felly thus compressing or bringing into action the springs 14 accordingly utilizing such action to cushion the load thereby.

The springs 14 are preferably secured at their outer ends to the tire member 13 as at 24 while their inner ends are positioned over posts 25 projecting outwardly from the felly 12. A suitable tread 26 in the form of an annular band of rubber or other suitable material is attached to the periphery of the tire section 13. It will be seen that the tire member 13 being mounted upon the springs 14 carried by the felly 12, the forward travel of the wheel in the direction from left to right in Fig. 1 suitably cushions the load upon the said springs, the relative movements of the felly 12 and tire member 13 being limited by the links 22. By removing the nuts 21 and retracting the sleeves 20, the felly 12 may be removed from the spokes 11 and the felly sections 15 may be swung inwardly upon the hinges 16 by removing the bolt 17 while the felly may be entirely removed from the tire section 13 by disconnecting the links 22.

What I claim as new is:—

1. A wheel comprising a hub and spokes carried thereby, a felly arranged in hinged sections, threaded sleeve connections between the felly sections and spokes, a tire section arranged outwardly of the felly, resilient members between the tire section and felly and connecting links pivoted between the tire section and felly.

2. A wheel having a hub, and spokes carried by the hub having threaded outer ends, a felly composed of a plurality of hinged sections, threaded studs upon the said felly sections arranged abutting the said spoke ends when the device is assembled, threaded connecting sleeves upon the said studs and spoke ends, lock nuts for the said sleeves carried by the said spokes and an annular tire member resiliently mounted upon the said felly.

In testimony whereof I affix my signature.

STANLY KASPRZYCKI.